US011427715B2

(12) United States Patent
Kidokoro et al.

(10) Patent No.: US 11,427,715 B2
(45) Date of Patent: Aug. 30, 2022

(54) COATING MATERIAL FOR GAS BARRIER, GAS BARRIER FILM, AND LAMINATED BODY

(71) Applicant: MITSUI CHEMICALS TOHCELLO, INC., Tokyo (JP)

(72) Inventors: Masako Kidokoro, Koga (JP); Akira Nomoto, Koga (JP)

(73) Assignee: MITSUI CHEMICALS TOCHELLO, INC., Tokyo (JP)

( * ) Notice: Subject to any disclaimer, the term of this patent is extended or adjusted under 35 U.S.C. 154(b) by 0 days.

(21) Appl. No.: 17/205,131

(22) Filed: Mar. 18, 2021

(65) Prior Publication Data
US 2021/0206981 A1 Jul. 8, 2021

Related U.S. Application Data

(62) Division of application No. 15/328,252, filed as application No. PCT/JP2015/071113 on Jul. 24, 2015, now Pat. No. 10,995,224.

(30) Foreign Application Priority Data

Jul. 31, 2014 (JP) ................... 2014-156311

(51) Int. Cl.
C09D 7/61 (2018.01)
C09D 7/40 (2018.01)
B32B 27/30 (2006.01)
C08K 5/00 (2006.01)
C09D 133/02 (2006.01)
C08K 3/00 (2018.01)
C09D 179/02 (2006.01)
C08L 79/02 (2006.01)
C08J 7/04 (2020.01)
C08J 7/043 (2020.01)
C08J 7/048 (2020.01)
B32B 27/06 (2006.01)
B32B 37/06 (2006.01)
C08J 7/16 (2006.01)
C09D 4/06 (2006.01)
C09D 5/00 (2006.01)
C08K 3/22 (2006.01)

(52) U.S. Cl.
CPC ............... C09D 7/61 (2018.01); B32B 27/06 (2013.01); B32B 27/30 (2013.01); B32B 37/06 (2013.01); C08J 7/043 (2020.01); C08J 7/048 (2020.01); C08J 7/0427 (2020.01); C08J 7/16 (2013.01); C08K 3/00 (2013.01); C08K 5/00 (2013.01); C08L 79/02 (2013.01); C09D 4/06 (2013.01); C09D 5/00 (2013.01); C09D 7/40 (2018.01); C09D 133/02 (2013.01); C09D 179/02 (2013.01); B32B 2307/7242 (2013.01); C08J 2367/02 (2013.01); C08J 2433/02 (2013.01); C08J 2479/02 (2013.01); C08K 3/22 (2013.01); C08K 2003/2296 (2013.01)

(58) Field of Classification Search
CPC ......... B32B 27/06; B32B 27/30; B32B 37/06; B32B 2307/7242; C08J 7/0427; C08J 7/043; C08J 7/048; C08J 7/16; C08J 2367/02; C08J 2433/02; C08J 2479/02; C08K 3/00; C08K 5/00; C08K 3/22; C08K 2003/2296; C08L 79/02; C09D 7/40; C09D 7/61; C09D 4/06; C09D 5/00; C09D 133/02; C09D 179/02
See application file for complete search history.

(56) References Cited

U.S. PATENT DOCUMENTS

| | | |
|---|---|---|
| 4,650,721 A | 3/1987 | Ashcraft et al. |
| 7,476,712 B2 | 1/2009 | Tanaka et al. |
| 8,808,816 B2 | 8/2014 | Yamazaki et al. |
| 2007/0134507 A1 | 6/2007 | Yamasaki et al. |
| 2010/0068438 A1 | 3/2010 | Yamazaki et al. |
| 2012/0305528 A1 | 12/2012 | Greenberg et al. |
| 2015/0086734 A1 | 3/2015 | Pietsch et al. |
| 2015/0232683 A1 | 8/2015 | Oto et al. |

FOREIGN PATENT DOCUMENTS

| | | |
|---|---|---|
| CN | 1911986 A | 2/2007 |
| JP | 60157830 A | 8/1985 |
| JP | 2001310425 A | 11/2001 |
| JP | 2003171468 A | 6/2003 |
| JP | 2005225940 A | 8/2005 |
| JP | 2013059930 A | 4/2013 |
| JP | 5280275 B2 | 9/2013 |
| JP | 2013256573 A | 12/2013 |
| JP | 2014094972 A | 5/2014 |
| WO | 2008068948 A1 | 6/2008 |

(Continued)

OTHER PUBLICATIONS

EPO, Comm. Pursuant to Article 94(3) EPC by EPO corres. to E.P. App. No. 15 826 402.8, EPO, Oct. 8, 2019, pp. 1-7 (Year: 2019).*
Communication pursuant to Article 94(3) EPC issued by the European Patent Office in corresponding European Patent Application No. 15826402.8-1107 on Oct. 5, 2019 (7 pages).
Second Office Action issued by The State Intellectual Property Office of People's Republic of China in corresponding Chinese Patent Application No. CN 201580041503.6 dated Apr. 3, 2019 (16 pages including partial English translation).
Extended Search Report issued by the European Patent Office in corresponding European Patent Application No. 15826402.8-1377 dated Dec. 5, 2017 (6 pages).

(Continued)

Primary Examiner — Maria V Ewald
Assistant Examiner — Ethan Weydemeyer
(74) Attorney, Agent, or Firm — Buchanan Ingersoll & Rooney PC

(57) ABSTRACT

A coating material for a gas barrier includes polycarboxylic acid, a polyamine compound, a polyvalent metal compound, and a base, in which (molar number of —COO— groups included in the polycarboxylic acid)/(molar number of amino groups included in the polyamine compound)=100/20 to 100/90.

6 Claims, No Drawings

(56) References Cited

FOREIGN PATENT DOCUMENTS

WO         2012166950 A2    12/2012
WO     WO-2012166950 A2 * 12/2012  ............. C09D 5/008

OTHER PUBLICATIONS

International Search Report (PCT/ISA/210) dated Oct. 27, 2015, by the Japanese Office as the International Searching Authority of International Application No. PCT/JP2015/071113.
Written Opinion (PCT/ISA/237) dated Oct. 27, 2015, by the Japanese Patent Office as the International Searching Authority for International Application No. PCT/JP2015/071113.

* cited by examiner

COATING MATERIAL FOR GAS BARRIER, GAS BARRIER FILM, AND LAMINATED BODY

CROSS-REFERENCE TO RELATED APPLICATIONS

This application is a division of U.S. patent application Ser. No. 15/328,252, filed on Jan. 23, 2017, now U.S. Pat. No. 10,995,224, which is a U.S. national stage application of PCT/JP2015/071113, filed on Jul. 24, 2015, which in turn claims priority to Japanese Patent Application No. 2014-156311, filed on Jul. 31, 2014, the entire contents of all of which are hereby incorporated by reference.

TECHNICAL FIELD

The present invention relates to a coating material for a gas barrier, a gas barrier film, and a laminated body.

BACKGROUND ART

In general, as gas barrier material against oxygen, water vapor, or the like, a gas barrier film where an inorganic oxide is deposited on a substrate surface which is formed of a biaxial stretching polyester film which is excellent in transparency and rigidness is used.

However, in a case of using such a gas barrier film using an inorganic oxide as a gas barrier film for wrapping as it is, since the deposited layer is weak against friction and the like, during printing in post-processing, during laminating, or when filling content therein, cracks in the deposited film may be caused by scratching or stretching and the gas barrier property may deteriorate.

Thus, a method of laminating polyvinyl alcohol and an ethylene-vinyl alcohol copolymer on a biaxial stretching film substrate as a gas barrier film (for example, Patent Document 1), a method of adding cross-linking agent components such as an isocyanate compound to polyacrylic acid (for example, Patent Document 2), and the like have been proposed.

Furthermore, in recent years, a gas barrier film which uses an ammonia-neutralized polycarboxylic acid, polyamine, and a swellable flaky-type inorganic compound has been proposed (for example, Patent Document 3).

RELATED DOCUMENT

Patent Document

[Patent Document 1] Japanese Unexamined Patent Publication No. 60-157830
[Patent Document 2] Japanese Unexamined Patent Publication No. 2001-310425
[Patent Document 3] Japanese Unexamined Patent Publication No. 2013-59930

SUMMARY OF THE INVENTION

However, for a gas barrier film formed by laminating polyvinyl alcohol and an ethylene-vinyl alcohol copolymer as described in Patent Document 1, the oxygen barrier property may deteriorate when set under high humidity. In addition, not only there is a problem with the productivity since heating at a high temperature over a long period is necessary in order to increase the gas barrier property of the film by allowing the esterification to sufficiently proceed, but there is also a problem in that the film is colored and the appearance is poor. Furthermore, even in the invention as described in Patent Document 2, there is a problem in that a process at a high temperature over a long period is necessary and there is a tendency for the film to be colored.

In addition, in the technique described in Patent Document 3, since a swellable flaky-type inorganic compound is used, there is a concern that the appearance will be whitened, the surface unevenness will be large, and the barrier film will be weak and easily break depending on the dispersion state or a blending ratio.

The present inventors researched means for solving the problems and discovered that, when combining a polyamine compound, a polycarboxylic acid, a polyvalent metal compound, and a base, a measurement such as the ratio of the molar number of amino groups included in the polyamine compound and the molar number of —COO— groups included in the polycarboxylic acid is effective as an index for evaluating the gas barrier property. Therefore, as a result of further research, it was discovered that it is possible to obtain a favorable gas barrier property by setting the ratio of the molar number of amino groups included in the polyamine compound and the molar number of —COO— groups included in the polycarboxylic acid to be within a specific range, thereby completing the present invention.

The present invention provides

[1] A coating material for a gas barrier including a polycarboxylic acid; a polyamine compound; a polyvalent metal compound; and a base, in which (molar number of —COO— groups included in the polycarboxylic acid)/(molar number of amino groups included in the polyamine compound)=100/20 to 100/90.

In addition, the present invention provides

[2] The coating material for a gas barrier according to [1], in which (a chemical equivalent of —COO— groups included in the polycarboxylic acid)/(a chemical equivalent of polyvalent metal contained in the polyvalent metal compound)=100/0.1 to 100/80,

[3] The coating material for a gas barrier according to [1] or [2], in which the polycarboxylic acid includes at least one selected from polyacrylic acid, polymethacrylic acid, and a copolymer of acrylic acid and methacrylic acid,

[4] The coating material for a gas barrier according to any one of [1] to [3], in which the polyvalent metal compound includes a divalent or higher valency metal compound,

[5] The coating material for a gas barrier according to [4], in which the polyvalent metal compound includes one type or two or more types of divalent metal compound selected from magnesium oxide, calcium oxide, barium oxide, zinc oxide, magnesium hydroxide, calcium hydroxide, barium hydroxide, and zinc hydroxide,

[6] The coating material for a gas barrier according to any one of [1] to [5], in which the polyamine compound includes a polyethylene imine,

[7] The coating material for a gas barrier according to any one of [1] to [6], in which the base includes ammonia,

[8] A gas barrier film formed of a cured product of the coating material for a gas barrier according to any one of [1] to [7], [9] The gas barrier film according to [8], in which, in an infrared absorption spectrum of the gas barrier film, when a total peak area in a range of an absorption band of equal to or more than 1493 $cm^{-1}$ and equal to or less than 1780 $cm^{-1}$ is A and a total peak area in a range of an absorption band of equal to or more than 1598 $cm^{-1}$ and equal to or less than 1690 $cm^{-1}$ is B, an area ratio of an amide bond which is indicated by B/A is 0.370 or more,

[10] The gas barrier film according to [9], in which, in an infrared absorption spectrum of the gas barrier film, when a total peak area in a range of an absorption band of equal to or more than 1690 cm$^{-1}$ and equal to or less than 1780 cm$^{-1}$ is C, an area ratio of carboxylic acid which is indicated by C/A is 0.400 or less,

[11] The gas barrier film according to [9] or [10], in which, in an infrared absorption spectrum of the gas barrier film, when a total peak area in a range of an absorption band of equal to or more than 1493 cm$^{-1}$ and equal to or less than 1598 cm$^{-1}$ is D, an area ratio of carboxylate which is indicated by D/A is 0.600 or less,

[12] The gas barrier film according to any one of [8] to [11], in which, when the gas barrier film is cut into 5 cm squares and mounted on a surface plate and a maximum gap generated between the gas barrier film and the surface plate is set as an amount of warpage, the amount of warpage at 23° C. measured by a thickness gauge is 5 mm or less,

[13] A laminated body including a substrate layer and a gas barrier film layer provided on at least one surface of the substrate layer and formed of the gas barrier film according to any one of [8] to [12],

[14] A method for manufacturing a laminated body including a step of applying the coating material for a gas barrier according to any one of [1] to [7] on a substrate layer; a step of forming a gas barrier film layer by drying and curing the coating material for a gas barrier; and a step of applying a heating treatment to the gas barrier film layer,

[15] A method for manufacturing the coating material for a gas barrier according to any one of [1] to [7] including a step of completely or partially neutralizing carboxy groups of the polycarboxylic acid by adding a base to the polycarboxylic acid; a step of mixing a polyvalent metal salt compound in an obtained mixture to form a metal salt in all or some of the carboxy groups of the polycarboxylic acid neutralized with the base and in the carboxy groups of the polycarboxylic acid not neutralized with the base; and a step of further mixing a polyamine compound in the obtained mixture.

The present invention provides a film where a gas barrier property, particularly an oxygen barrier property, is favorable under conditions of both low humidity and high humidity, a coating material for a gas barrier which is able to form a film layer, a gas barrier film which uses the same, and a laminated body thereof.

DESCRIPTION OF EMBODIMENTS

Description will be given below of embodiments of the present invention. Here, unless otherwise specifically stated, "to" between the numbers in the sentences represents the equal to or more than first number and equal to or less than the second number.

<Coating Material for Gas Barrier>

The coating material for a gas barrier includes polycarboxylic acid, a polyamine compound, a polyvalent metal compound, and a base, in which (a molar number of —COO— groups included in the polycarboxylic acid)/(a molar number of amino groups included in the polyamine compound)=100/20 to 100/90.

The polycarboxylic acid has two or more carboxy groups in the molecule. Specifically, examples thereof include a homopolymer of α,β-unsaturated carboxylic acid such as acrylic acid, methacrylic acid, itaconic acid, fumaric acid, crotonic acid, cinnamic acid, 3-hexenoic acid, and 3-hexenedioic acid, or a copolymer thereof. In addition, the copolymer may be a copolymer of the α,β-unsaturated carboxylic acid described above and esters such as ethyl ester, olefins such as ethylene, or the like. Among these, a homopolymer of acrylic acid, methacrylic acid, itaconic acid, fumaric acid, crotonic acid, and cinnamic acid or a copolymer thereof is preferable, at least one selected from polyacrylic acid, polymethacrylic acid, and a copolymer of acrylic acid and methacrylic acid is more preferable, at least one selected from polyacrylic acid and polymethacrylic acid is even more preferable, and a homopolymer of acrylic acid or a homopolymer of methacrylic acid is even more preferable.

Here, in the present embodiment, polyacrylic acid includes both a homopolymer of acrylic acid and a copolymer of acrylic acid and another monomer. In a case of a copolymer of acrylic acid and another monomer, the polyacrylic acid generally includes constituent units which are derived from acrylic acid at 90 mass % or more in 100 mass % of the polymer, preferably 95 mass % or more, and more preferably 99 mass % or more.

In addition, in the present embodiment, polymethacrylic acid includes both a homopolymer of methacrylic acid and a copolymer of methacrylic acid and another monomer. In a case of a copolymer of methacrylic acid and another monomer, the polymethacrylic acid generally includes constituent units which are derived from methacrylic acid at 90 mass % or more in 100 mass % of polymer, preferably 95 mass % or more, and more preferably 99 mass % or more.

Polycarboxylic acid is a polymer where carboxylic acid monomers are polymerized and the molecular weight of the polycarboxylic acid is preferably 50 to 5,000,000 from the point of view of obtaining a superior gas barrier property and more preferably 100 to 4,000,000. Furthermore, 500 to 3,000,000 is preferable.

Here, in the present embodiment, the molecular weight of the polycarboxylic acid is the polyethylene oxide conversion weight average molecular weight and is measurable using gel permeation chromatography (GPC).

It is possible to suppress gelation from occurring by neutralizing the polycarboxylic acid with a base when mixing a polyamine compound and polycarboxylic acid. Accordingly, in the polycarboxylic acid, from the point of view of prevention of gelation, a partially neutralized product or a completely neutralized product of a carboxy group is made using a base. It is possible to obtain the neutralized product by partially or completely neutralizing the carboxy group of polycarboxylic acid with abase (that is, the carboxy group of the polycarboxylic acid is partially or completely made into carboxylate). Due to this, it is possible to prevent gelation when adding a polyamine compound or a polyvalent metal compound.

A partially neutralized product is prepared by adding a base to an aqueous solution of polycarboxylic acid polymer and it is possible to set a desired neutralization degree by adjusting the ratio of the amounts of the polycarboxylic acid and the base. In the present embodiment, the neutralization degree of polycarboxylic acid by the base is preferably 30 to 100 equivalent % from the point of view of sufficiently suppressing gelation caused by the neutralization reaction with an amino group of a polyamine compound, and more preferably 50 to 100 equivalent %.

It is possible to use an arbitrary water-soluble base as a base. It is possible to use either or both of a volatile base and a non-volatile base as a water-soluble base; however, a volatile base which is easily removed when drying or curing is preferable from the point of view of suppressing deterioration in the gas barrier property due to a residual free base.

Examples of volatile bases include ammonia, morpholine, alkylamine, 2-dimethyl amino ethanol, N-methyl morpholine, ethylene diamine, and tertiary amines such as triethyl amine, an aqueous solution thereof or a mixture thereof. From the point of view of obtaining a favorable gas barrier property, an ammonia aqueous solution is preferable.

Examples of non-volatile bases include sodium hydroxide, lithium hydroxide, and potassium hydroxide, an aqueous solution thereof, or a mixture thereof.

A polyamine compound is a polymer which has two or more aminos in the main chain, a side chain, or a terminal. In detail, examples thereof include aliphatic polyamines such as polyallyl amine, polyvinyl amine, polyethylene imine, and poly(trimethylene imine); polyamides which have amino groups on a side chain such as polylysine and polyarginine; and the like. In addition, the polyamine compound may be a polyamine where some amino groups are modified. From the point of view of obtaining a favorable gas barrier property, a polyethylene imine is more preferable.

The weight average molecular weight of the polyamine compound is preferably 50 to 5,000,000 from the point of view of improving the gas barrier property, more preferably 100 to 4,000,000, and even more preferably 200 to 3,000,000.

Here, in the present embodiment, it is possible to measure the molecular weight of the polyamine compound using an ebullioscopic method or viscometry.

A polyvalent metal compound is a metal and a metal compound which belongs to Group 2 to 13 in the periodic table and, in detail, a divalent or higher valency metal such as magnesium (Mg), calcium (Ca), strontium (Sr), barium (Ba), iron (Fe), cobalt (Co), nickel (Ni), copper (Cu), zinc (Zn), and aluminum (Al), and oxides, hydroxides, halogenides, carbonates, phosphates, phosphites, hypophosphites, sulfates, or sulfites of these metals, or the like. From the point of view of water resistance, impurities, and the like, a metal oxide or a metal hydroxide is preferable.

Among the divalent or higher valency metals described above, Mg, Ca, Zn, Ba, Al, and particularly Zn are preferable. In addition, among the metal compounds described above, a divalent or higher valency metal compound is preferable, and a divalent metal compound such as magnesium oxide, calcium oxide, barium oxide, zinc oxide, magnesium hydroxide, calcium hydroxide, barium hydroxide, and zinc hydroxide are more preferable.

Regarding these polyvalent metal compounds, it is sufficient if at least one type is used and the polyvalent metal compound may be one type or two or more types.

In the present embodiment, (molar number of —COO— groups included in polycarboxylic acid)/(molar number of amino groups included in a polyamine compound) is 100/20 or more, preferably 100/25 or more, more preferably 100/29 or more, even more preferably 100/35 or more, and particularly preferably 100/40 or more. By setting (molar number of —COO— groups included in polycarboxylic acid)/(molar number of amino groups included in a polyamine compound) to be 100/20 or more, a sufficient gas barrier property is obtained even under high humidity.

On the other hand, (molar number of —COO— groups included in polycarboxylic acid)/(molar number of amino groups included in a polyamine compound) is 100/90 or less, preferably 100/85 or less, more preferably 100/65 or less, even more preferably 100/55 or less, even more preferably 100/50 or less, and particularly preferably 100/45 or less. By setting (molar number of —COO— groups included in polycarboxylic acid)/(molar number of amino groups included in a polyamine compound) to be 100/90 or less, a sufficient gas barrier property is obtained even under low humidity.

Details of the reason are not clear; however, it is considered that it is possible to obtain a gas barrier film or a gas barrier film layer which has a gas barrier property which is excellent under both high humidity and low humidity by forming a well-balanced fine structure by amide cross-linking using amino groups which form a polyamine compound and metal cross-linking using polyvalent metals which form a salt of polycarboxylic acid and polyvalent metal.

In addition, (a chemical equivalent of —COO— groups included in the polycarboxylic acid)/(a chemical equivalent of polyvalent metal contained in the polyvalent metal compound) is preferably 100/0.1 or more, more preferably 100/1 or more, even more preferably 100/5 or more, even more preferably 100/8 or more, and particularly preferably 100/13 or more. Due to this, it is possible to more effectively obtain a gas barrier property under high humidity and under low humidity.

On the other hand, (a chemical equivalent of —COO— groups included in the polycarboxylic acid)/(a chemical equivalent of polyvalent metal contained in the polyvalent metal compound) is preferably 100/80 or less, more preferably 100/70 or less, even more preferably 100/60 or less, even more preferably 100/40 or less, and particularly preferably 100/20 or less. Due to this, it is possible to more effectively obtain a gas barrier property under high humidity and under low humidity.

Here, in the present embodiment, the chemical equivalent has the meaning of a molar equivalent.

The coating material for a gas barrier may include other additive agents within a range in which the object of the present invention is not adversely affected. For example, various types of additive agents such as a lubricant, a slipping agent, an anti-blocking agent, an anti-static agent, an anti-fogging agent, a pigment, a dye, and an inorganic or organic filler may be added and various types of surfactants and the like may be added beforehand in order to improve the wettability with a substrate layer which will be described below. Examples of the surfactant include an anionic surfactant, a nonionic surfactant, a cationic surfactant, and an amphoteric surfactant, and a nonionic surfactant is preferable from the point of view of obtaining a favorable coating property, and polyoxyethylene alkyl ether is more preferable.

<Method for Manufacturing Coating Material for Gas Barrier>

In order to obtain a coating material for a gas barrier in the present embodiment, it is important to tightly control each factor such as the selection of material, the mixing amount of material, the adjustment of solution concentration, and the mixing order in a mixed liquid.

For example, it is possible to manufacture the coating material for a gas barrier as follows.

Firstly, carboxy groups of polycarboxylic acid are completely or partially neutralized by adding a base to polycarboxylic acid. A polyvalent metal salt compound is further mixed therein and a metal salt is formed in all or some of the carboxy groups of the polycarboxylic acid neutralized with the base and the carboxy groups of the polycarboxylic acid not neutralized with the base described above. After that, the coating material for a gas barrier is obtained by further adding a polyamine compound.

More details are as follows.

Firstly, a completely or partially neutralized solution of carboxy groups which form the polycarboxylic acid is prepared.

Subsequently, a base is added thereto and the carboxy groups of polycarboxylic acid are completely neutralized or partially neutralized. By neutralizing the carboxy groups of the polycarboxylic acid, gelation which is generated by the reaction of carboxy groups which form polycarboxylic acid and amino groups which form a polyamine compound when adding a polyvalent metal compound or a polyamine compound is effectively prevented and it is possible to obtain an uniform gas barrier film.

Subsequently, a polyvalent metal compound is added thereto and dissolved and a polyvalent metal salt with —COO— groups which form polycarboxylic acid is formed by the polyvalent metal ions which are produced. At this time, the —COO— groups which form a salt with the polyvalent metal ions refer to both carboxy groups which are not neutralized with the base and —COO— groups which are neutralized with a base described above. In a case of the —COO— groups which are neutralized with a base, polyvalent metal ions which are derived from the polyvalent metal compound described above are replaced and oriented to form a polyvalent metal salt of a —COO— group. Then, it is possible to obtain the coating material for a gas barrier by further adding a polyamine compound after forming a polyvalent metal salt.

A gas barrier film layer is formed by applying the coating material for a gas barrier produced in this manner on a substrate layer and carrying out drying and curing. At this time, a polyvalent metal of a polyvalent metal salt of —COO— groups which form a polycarboxylic acid forms metal cross-links, and amide cross-links are formed by amino groups which form the polyamine to obtain a gas barrier film layer which has an excellent gas barrier property.

In addition, a polyamine compound is added thereto and a mixed solution is prepared so as to satisfy (a molar number of —COO— groups included in the polycarboxylic acid described above)/(a molar number of amino groups included in the polyamine compound described above)=100/20 to 100/90 in the polycarboxylic acid and the polyamine compound. Furthermore, it is preferable that (a chemical equivalent of —COO— groups included in the polycarboxylic acid)/(a chemical equivalent of polyvalent metal contained in the polyvalent metal compound)=100/0.1 to 100/80 from the point of view of improving the gas barrier property by metal cross-linking.

Due to this, when (the molar number of —COO— groups included in the polycarboxylic acid described above)/(the molar number of amino groups included in the polyamine compound described above)=100/20 to 100/90, it is possible to obtain a gas barrier property under conditions of both under low humidity and under high humidity, particularly, a gas barrier property in which the oxygen barrier property is favorable.

<Laminated Body>

A laminated body has a gas barrier film layer formed by applying and curing a coating material for a gas barrier on a substrate layer.

It is possible to use a substrate layer without being particularly limited as long as it is possible to apply a solution of the coating material for a gas barrier thereon. Examples thereof include organic materials such as a thermosetting resin, a thermoplastic resin, or paper, inorganic materials such as glass, potter, ceramic, silicon oxide, silicon oxynitride, silicon nitride, and cement, or metals such as aluminum, aluminum oxide, iron, copper, and stainless steel, a substrate layer with a multilayer structure which is formed of a combination of organic materials or of organic materials and inorganic materials, and the like. Among these, for example, in the case of various types of film uses such as wrapping material or panels, a plastic film which uses a thermosetting resin and a thermoplastic resin or an organic material such as paper is preferable. In addition, from the point of view of obtaining an excellent gas barrier property, the substrate layer is preferably formed of a thermoplastic resin which has one type or two or more types of layers of aluminum, aluminum oxide, silicon nitride, and silicon oxynitride, and more preferably formed of a thermoplastic resin which has at least one type of layer of aluminum and aluminum oxide.

As a thermosetting resin, it is possible to use a thermosetting resin known in the art. Examples thereof include an epoxy resin, an unsaturated polyester resin, a phenol resin, a urea melamine resin, a polyurethane resin, a silicone resin, a polyimide, and the like.

As a thermoplastic resin, it is possible to use a thermoplastic resin known in the art. Examples thereof include polyolefin (polyethylene, polypropylene, poly(4-methyl-1-pentene), poly(1-butene), and the like), polyester (polyethylene terephthalate, polybutylene terephthalate, polyethylene naphthalate, and the like), polyamide (nylon-6, nylon-66, polymetaxylene adipamide, and the like), polyvinyl chloride, polyimide, an ethylene-vinyl acetate copolymer or a saponified product thereof, polyvinyl alcohol, polyacrylonitrile, polycarbonate, polystyrene, ionomers, a fluorine resin, a mixture thereof, and the like.

Among these, from the point of view of making the transparency favorable, polypropylene, polyethylene terephthalate, polyethylene naphthalate, polyamide, polyimide, and the like are preferable.

In addition, a substrate layer formed of a thermoplastic resin may be a single layer or may be layers of two or more types according to the use of the gas barrier film.

In addition, the film formed of the thermosetting resin and thermoplastic resin described above may be stretched at least in one direction, preferably in a biaxial direction, to make the substrate layer.

In addition, an inorganic compound such as aluminum, zinc, or silica, oxides thereof, or the like may be deposited on the surface of the substrate layer and polyvinylidene chloride, polyvinyl alcohol, an ethylene-vinyl alcohol copolymer, an acryl resin, a urethane-based resin, and the like may be coated thereon.

In addition, a substrate layer may be subjected to a surface treatment in order to improve the adhesiveness with the gas barrier film. In detail, a surface activation treatment such as a corona treatment, a flame treatment, a plasma treatment, an undercoat treatment, a primer coat treatment, a flame treatment, or the like may be performed.

The thickness of the substrate layer is preferably 1 to 1000 µm from the point of view of obtaining favorable film characteristics, more preferably 1 to 500 µm, and even more preferably 1 to 300 µm.

The shape of the substrate layer is not particularly limited; however, examples thereof include a sheet or film shape and the shapes of a tray, a cup, a hollow body, and the like.

In addition, an adhesive agent layer may be provided between a substrate layer and a gas barrier film layer.

It is sufficient if the adhesive agent layer includes an adhesive agent known in the art. Examples of the adhesive agent include a laminate adhesive agent which is composed of an organic titanium-based resin, a polyethylene imine-based resin, a urethane-based resin, an epoxy-based resin, an acryl-based resin, a polyester-based resin, an oxazoline group-containing resin, a modified silicone resin, alkyl titanate, polyester-based polybutadiene, and the like, one pack type or two pack type polyol and polyvalent isocyanate, water-based urethane, ionomer, and the like. Alternatively, an aqueous adhesive agent which has an acryl-based, vinyl acetate-based, urethane-based, or polyester resin and the like as the main raw material may be used.

In addition, according to the use of the gas barrier film, other additives such as a curing agent and a silane coupling agent may be added to the adhesive agent. In a case where the use of the gas barrier film is for hydrothermal treatment of a retort or the like, from the point of view of the heat resistance or water resistance, an adhesive agent for a dry laminate which is represented by a polyurethane-based adhesive agent is preferable, and a solvent-based two-liquid curing type polyurethane-based adhesive agent is more preferable.

<Gas Barrier Film>

The gas barrier film is formed of a coating material for a gas barrier and is obtained by performing a drying and heating treatment after applying a coating material for a gas barrier on a substrate layer, curing the coating material for a gas barrier, and forming a gas barrier film layer. That is, the gas barrier film is obtained by curing the coating material for a gas barrier.

The oxygen permeability at 20° C. and 90% RH at a thickness of 1 μm of the gas barrier film is preferably 5 ml/m$^2$·day·MPa or less, and more preferably 2 ml/m$^2$·day·MPa or less. Due to this, it is possible to obtain a favorable gas barrier property.

Here, on the basis of JIS K 7126, the oxygen permeability is measured under the conditions of a temperature of 20° C. and humidity of 90% RH.

In addition, in an infrared absorption spectrum of a gas barrier film or a gas barrier film layer according to the present embodiment, when a total peak area in a range of an absorption band of equal to or more than 1493 cm$^{-1}$ and equal to or less than 1780 cm$^{-1}$ is A and a total peak area in a range of an absorption band of equal to or more than 1598 cm$^{-1}$ and equal to or less than 1690 cm$^{-1}$ is B, an area ratio of an amide bond which is indicated by B/A is preferably 0.370 or more from the point of view of the gas barrier property, more preferably 0.400 or more, even more preferably 0.420 or more, and particularly preferably 0.430 or more. In addition, the upper limit of the area ratio of the amide bond which is indicated by B/A is preferably 0.950 or less from the point of view of further improving the barrier property, appearance, and dimensional stability, more preferably 0.900 or less, even more preferably 0.800 or less, even more preferably 0.600 or less, even more preferably 0.550 or less, and particularly preferably 0.500 or less. When the area ratio of the amide bond which is indicated by B/A is 0.950 or less, since the brittleness of the layer which has amide cross-linking is low and cracks are less easily generated, it is possible to further suppress deterioration of the barrier property caused by stress such as bending in the film.

In addition, in an infrared absorption spectrum of a gas barrier film or a gas barrier film layer according to the present embodiment, when a total peak area in a range of an absorption band of equal to or more than 1690 cm$^{-1}$ and equal to or less than 1780 cm$^{-1}$ is C, an area ratio of carboxylic acid which is indicated by C/A is preferably 0.010 or more from the point of view of further improving the oxygen barrier property, the appearance such as warpage, and the dimensional stability, more preferably 0.030 or more, and particularly preferably 0.070 or more.

In addition, the upper limit of the area ratio of carboxylic acid which is indicated by C/A described above is preferably 0.400 or less from the point of view of further improving the oxygen barrier property, the appearance such as warpage, and the dimensional stability, more preferably 0.300 or less, and particularly preferably 0.250 or less.

Furthermore, in an infrared absorption spectrum of a gas barrier film or a gas barrier film layer according to the present embodiment, when a total peak area in a range of an absorption band of equal to or more than 1493 cm$^{-1}$ and equal to or less than 1598 cm$^{-1}$ is D, an area ratio of carboxylate which is indicated by D/A is preferably 0.150 or more from the point of view of further improving the oxygen barrier property, and more preferably 0.350 or more.

In addition, the upper limit of the area ratio of the carboxylate which is indicated by D/A described above is preferably 0.600 or less from the point of view of further improving the balance of the gas barrier property, the appearance such as warpage, and the dimensional stability and more preferably 0.550 or less.

In an infrared absorption spectrum of the gas barrier film or the gas barrier film layer according to the present embodiment, absorption based on νC=O of unreacted carboxylic acid is seen in the vicinity of 1700 cm$^{-1}$, absorption based on νC=O of an amide bond which is a cross-linking structure is seen in the vicinity of 1630 to 1685 cm$^{-1}$, and absorption based on νC=O of carboxylate is seen in the vicinity of 1540 to 1560 cm$^{-1}$.

That is, in the present embodiment, it is considered that, in an infrared absorption spectrum, the total peak area A in a range of an absorption band of equal to or more than 1493 cm$^{-1}$ and equal to or less than 1780 cm$^{-1}$ represents an index of the total amount of carboxylic acid, an amide bond, and carboxylate and the total peak area B in a range of an absorption band of equal to or more than 1598 cm$^{-1}$ and equal to or less than 1690 cm$^{-1}$ represents an index of the amount of an amide bond present. Furthermore, it is considered that the total peak area C in a range of an absorption band of equal to or more than 1690 cm$^{-1}$ and equal to or less than 1780 cm$^{-1}$ represents an index of the amount of unreacted carboxylic acid present and the total peak area D in a range of an absorption band of equal to or more than 1493 cm$^{-1}$ and equal to or less than 1598 cm$^{-1}$ represents an index of the amount of carboxylate present, that is, of ion cross-linking of a carboxyl group and an amino group.

Here, in the present embodiment, it is possible to measure the total peak areas A to D described above with the following procedure.

Firstly, a 1 cm×3 cm measurement sample is cut out from a gas barrier film or a gas barrier film layer. Subsequently, an infrared absorption spectrum of the surface of the gas barrier film or the gas barrier film layer is obtained by infrared total reflection measurement (an ATR method). The total peak areas A to D described above are calculated from the obtained infrared absorption spectrum in the procedures (1) to (4) below.

(1) The absorbance at 1780 cm$^{-1}$ and at 1493 cm$^{-1}$ are connected by a straight line (N), and the area surrounded by the absorption spectrum in the range of the absorption band of equal to or more than 1493 cm$^{-1}$ and equal to or less than 1780 cm$^{-1}$ and N is set as the total peak area A.

(2) A straight line (O) is drawn down orthogonally from absorbance (Q) at 1690 cm$^{-1}$, an intersection point of N and O is set as P, a straight line (S) is drawn down orthogonally from absorbance (R) at 1598 cm$^{-1}$, an intersection point of N and S is set as T, and the area which is surrounded by the absorption spectrum in the range of an absorption band of equal to or more than 1598 cm$^{-1}$ and equal to or less than 1690 cm$^{-1}$, the straight line S, the point T, the straight line N, the point P, the straight line 0, the absorbance Q, and the absorbance R is set as the total peak area B.

(3) The area which is surrounded by the absorption spectrum in the range of an absorption band of equal to or more than 1690 cm$^{-1}$ and equal to or less than 1780 cm$^{-1}$, the absorbance Q, the straight line 0, the point P, and the straight line N is set as the total peak area C.

(4) The area which is surrounded by the absorption spectrum in the range of an absorption band of equal to or more than 1493 cm$^{-1}$ and equal to or less than 1598 cm$^{-1}$, the absorbance R, the straight line S, the point T, and the straight line N is set as the total peak area D.

Subsequently, the area ratios B/A, C/A, and D/A are obtained from the areas obtained by the method described above.

Here, it is possible to perform the measurement (infrared total reflection: the ATR method) of the infrared absorption spectrum of the present embodiment, for example, under the conditions of an incident angle of 45 degrees, room temperature, a resolution of 4 cm$^{-1}$, and a cumulative number of 100 times by mounting a PKM-GE-S (Germanium) crystal and using an IRT-5200 apparatus manufactured by JASCO Corporation.

It is possible to control the area ratio of an amide bond which is indicated by B/A of the gas barrier film or the gas barrier film layer according to the present embodiment, the area ratio of carboxylic acid which is indicated by C/A, and the area ratio of carboxylate which is indicated by D/A by appropriately adjusting the manufacturing conditions of the gas barrier film or the gas barrier film layer.

In the present embodiment, in particular, the blending ratio of polycarboxylic acid and a polyamine compound, the method for preparing a coating material for a gas barrier, and the method, the temperature, the time, and the like of the heating treatment of the coating material for a gas barrier described above are given as factors for controlling the area ratio of an amide bond which is indicated by B/A described above, the area ratio of carboxylic acid which is indicated by C/A described above, and the area ratio of carboxylate which is indicated by D/A described above.

In addition, the amount of warpage at 23° C. of the gas barrier film or the laminated body according to the present embodiment is preferably 5 mm or less and more preferably 3 mm or less. Here, the amount of warpage of the gas barrier film or the laminated body is the maximum gap which is generated between the gas barrier film or the laminated body and the surface plate when mounting the gas barrier film or the laminated body which is cut out in 5 cm squares on a surface plate and is measured by a thickness gauge.

The gas barrier film or the laminated body with a small amount of warpage is excellent in handleability. In addition, it is possible to suppress a positional shift with another layer when laminating the gas barrier film or the laminated body on another layer.

<Method for Manufacturing Laminated Body>

The method for manufacturing a laminated body has a step of applying the coating material for a gas barrier described above on a substrate layer, a step of forming a gas barrier film layer by drying and curing the coating material for a gas barrier described above, and a step of applying a heating treatment to the gas barrier film layer described above.

The method of coating is not particularly limited and it is possible to use a general method. Examples thereof include a coating method using various types of coating apparatuses known in the art such as a Meyer bar coater, an air knife coater, a gravure coater such as a direct gravure coater, a gravure off set, an arc gravure coater, a gravure reverse, and a jet nozzle system, a reverse roll coater such as a top feed reverse coater, a bottom feed reverse coater, and a nozzle feed reverse coater, a 5 roll coater, a lip coater, a bar coater, a bar reverse coater, a die coater, and the like.

The coating amount (wet) is preferably 1 to 500 μm, more preferably 1 to 300 and even more preferably 1 to 100 and the thickness of the gas barrier film layer after drying and curing is preferably 0.01 to 250 more preferably 0.01 to 150 and even more preferably 0.01 to 50 μm.

Regarding the drying and heating treatment, the heating treatment may be performed after drying and the drying and heating treatments may be performed at the same time.

The method of carrying out the drying and heating treatment is not particularly limited; however, it is sufficient if it is possible to cure the coating material for a gas barrier. Examples thereof include a method using convective heat transfer such as an oven and a dryer, a method using conductive heat transfer such as a heating roller, a method using radiant heat transmission which uses electromagnetic waves such as an infrared ray, far infrared ray, or near infrared ray heater, a method using internal heat generation such as microwaves, and the like.

In a case of a heating treatment using an oven, 120° C. to 250° C. for 0.01 seconds to 60 minutes is preferable, and 180° C. to 220° C. for approximately 0.01 seconds to 60 minutes is more preferable. Due to this, it is possible to further reduce the oxygen permeability.

In a case of continuously performing a heating treatment, treatment using a heating roller and a far infrared ray oven is effective. In addition, the heating treatment may be performed under normal pressure or under reduced pressure.

Regarding the coating material for a gas barrier, by reacting carboxyl groups of polycarboxylic acid with polyamine or a polyvalent metal compound by carrying out a drying and heating treatment and carrying out covalent bonding and ion cross-linking, it is possible to obtain a favorable gas barrier property even under high humidity.

The laminated body is excellent in oxygen resistance permeability (gas barrier property) and may be favorably used as wrapping material, particularly, food wrapping material, for contents for which a high gas barrier property is demanded, and even as various wrapping materials for medical uses, industrial uses, and the like.

Description is given above of the embodiments of the present invention with reference to the drawings; however, these are examples of the present invention and it is also possible to adopt various configurations other than the above.

EXAMPLES

Description will be given below of the present invention in more detail using Examples. However, the present invention is not limited to any one of Examples below.

<Production of Solution (U)>

87.5 g of an ammonium acrylate aqueous solution was obtained in which purified water was added to the mixture of 0.76 g of zinc oxide (produced by Wako Pure Chemical Industries, Ltd.) and ammonium acrylate (produced by Toagosei Co., Ltd., product name: Aron A-30, a 30% aqueous solution) to make a 10% solution.

Next, 12.5 g of a polyethylene imine aqueous solution was obtained in which purified water was added to polyethylene imine (produced by Wako Pure Chemical Industries, Ltd., product name: P-70) to make a 10% solution.

Next, a mixed liquid was produced by mixing and stirring 87.5 g of the ammonium acrylate aqueous solution described above and 12.5 g of the polyethylene imine aqueous solution described above.

Furthermore, a solution (U) was produced by adding purified water such that the solid content concentration of the mixed liquid described above was 2.5% and, after stirring the solution to be uniform, mixing an activator (produced by Kao Corporation., product name: Emulgen 120) so as to be 0.3 weight % with respect to the solid content of the mixed liquid.

<Preparation of Solution (V)>

83 g of an ammonium acrylate aqueous solution was obtained in which purified water was added to the mixture of 0.76 g of zinc oxide (produced by Wako Pure Chemical Industries, Ltd.) and ammonium acrylate (produced by Toagosei Co., Ltd., product name: Aron A-30, a 30% aqueous solution) to make a 10% solution.

Next, 17 g of a polyethylene imine aqueous solution was obtained in which purified water was added to polyethylene imine (product name: P-70, produced by Wako Pure Chemical Industries, Ltd.) to make a 10% solution.

Next, a mixed liquid was produced by mixing and stirring 83 g of the ammonium acrylate aqueous solution described above and 17 g of the polyethylene imine aqueous solution described above.

Furthermore, a solution (V) was produced by adding purified water such that the solid content concentration of the mixed liquid described above was 2.5% and, after stirring the solution to be uniform, mixing an activator (produced by Kao Corporation., product name: Emulgen 120) so as to be 0.3 weight % with respect to the solid content of the mixed liquid.

<Preparation of Solution (W)>

83 g of an ammonium acrylate aqueous solution was obtained in which purified water was added to a mixture of 1.14 g of zinc oxide (produced by Wako Pure Chemical Industries, Ltd.) and ammonium acrylate (produced by Toagosei Co., Ltd., product name: Aron A-30, a 30% aqueous solution) to make a 10% solution.

Next, 17 g of a polyethylene imine aqueous solution was obtained in which purified water was added to polyethylene imine (product name: P-70, produced by Wako Pure Chemical Industries, Ltd.) to make a 10% solution.

Next, a mixed liquid was produced by mixing and stirring 83 g of the ammonium acrylate aqueous solution described above and 17 g of the polyethylene imine aqueous solution described above.

Furthermore, a solution (W) was produced by adding purified water such that the solid content concentration of the mixed liquid described above was 2.5% and, after stirring the solution to be uniform, mixing an activator (produced by Kao Corporation., product name: Emulgen 120) so as to be 0.3 weight % with respect to the solid content of the mixed liquid.

<Preparation of Solution (X)>

72.1 g of an ammonium acrylate aqueous solution was obtained in which purified water was added to a mixture of 0.66 g of zinc oxide (produced by Wako Pure Chemical Industries, Ltd.) and ammonium acrylate (produced by Toagosei Co., Ltd., product name: Aron A-30, a 30% aqueous solution) to make a 10% solution.

Next, 27.9 g of a polyethylene imine aqueous solution was obtained in which purified water was added to polyethylene imine (product name: P-70, produced by Wako Pure Chemical Industries, Ltd.) to make a 10% solution.

Next, a mixed liquid was produced by mixing and stirring 72.1 g of the ammonium acrylate aqueous solution described above and 27.9 g of the polyethylene imine aqueous solution described above.

Furthermore, a solution (X) was produced by adding purified water such that the solid content concentration of the mixed liquid described above was 2.5% and, after stirring the solution to be uniform, mixing an activator (produced by Kao Corporation., product name: Emulgen 120) so as to be 0.3 weight % with respect to the solid content of the mixed liquid.

<Preparation of Solution (Y)>

87.5 g of an ammonium acrylate aqueous solution was obtained in which purified water was added to ammonium acrylate (produced by Toagosei Co., Ltd., product name: Aron A-30, a 30% aqueous solution) to make a 10% solution.

Next, 12.5 g of a polyethylene imine aqueous solution was obtained by adding purified water to polyethylene imine (product name: P-70, produced by Wako Pure Chemical Industries, Ltd.) to make a 10% solution.

Next, a mixed liquid was produced by mixing and stirring 87.5 g of the ammonium acrylate aqueous solution described above and 12.5 g of the polyethylene imine aqueous solution described above.

Furthermore, a solution (Y) was produced by adding purified water such that the solid content concentration of the mixed liquid described above was 2.5% and, after stirring the solution to be uniform, mixing an activator (produced by Kao Corporation., product name: Emulgen 120) so as to be 0.3 weight % with respect to the solid content of the mixed liquid.

<Preparation of Solution (Z)>

72.1 g of an ammonium acrylate aqueous solution was obtained in which purified water was added to ammonium acrylate (produced by Toagosei Co., Ltd., product name: Aron A-30, a 30% aqueous solution) to make a 10% solution.

Next, 27.9 g of a polyethylene imine aqueous solution was obtained in which purified water was added to polyethylene imine (product name: P-70, manufactured by Wako Pure Chemical Industries, Ltd.) to make a 10% solution.

Next, a mixed liquid was produced by mixing and stirring 72.1 g of the ammonium acrylate aqueous solution described above and 27.9 g of the polyethylene imine aqueous solution described above.

Furthermore, a solution (Z) was produced by adding purified water such that the solid content concentration of the mixed liquid described above was 2.5% and, after stirring the solution to be uniform, mixing an activator (produced by Kao Corporation., product name:

Emulgen 120) so as to be 0.3 weight % with respect to the solid content of the mixed liquid.

Example 1

A gas barrier film was obtained by applying a liquid adjusted to a solution (U) liquid concentration of 2.5% on an easy adhesion surface of biaxial stretching polyethylene naphthalate of 12 μm using a Meyer bar such that the coating amount after drying (that is, the thickness of the gas barrier film) is 0.3 μm, drying the resultant under the conditions of a temperature of 100° C. and a time of 30 seconds using a hot air dryer, and further carrying out a heating treatment at temperature of 215° C. and a time of 5 minutes in the hot air dryer after that.

The following evaluation of the obtained gas barrier films was performed and the results thereof are shown in Table 1.

Example 2

Example 2 was made in the same manner as Example 1 apart from using a solution (V) instead of the solution (U).

Example 3

Example 3 was made in the same manner as Example 2 apart from carrying out the heating treatment at 215° C. for "2 minutes" instead of "5 minutes".

Example 4

Example 4 was made in the same manner as Example 1 apart from using a solution (W) instead of the solution (U).

Example 5

Example 5 was made in the same manner as Example 1 apart from using a solution (X) instead of the solution (U).

Comparative Example 1

Comparative Example 1 was made in the same manner as Example 1 apart from using a solution (Y) instead of the solution (U).

Comparative Example 2

Comparative Example 2 was made in the same manner as Example 1 apart from using a solution (Z) instead of the solution (U).

Then, the oxygen permeability for a thickness of 1 μm of the gas barrier film was converted by the following equation.

Conversion equation: oxygen permeability for gas barrier film thickness 1 μm=oxygen permeability measurement value of gas barrier film (gas barrier film thickness 0.3 μm)×0.3 μm.

(2) IR Area Ratio

Measurement (infrared total reflection: the ATR method) of the infrared absorption spectrum was performed under the conditions of an incident angle of 45 degrees, room temperature, a resolution of 4 $cm^{-1}$, and a cumulative number of 100 times by mounting a PKM-GE-S (Germanium) crystal using an IRT-5200 apparatus manufactured by JASCO Corporation. The total peak areas A to D were calculated by analyzing the obtained absorption spectrum by the method described above. Then, the area ratios B/A, C/A, and D/A were obtained from the total peak areas A to D.

(3) Amount of Warpage

The amount of warpage at 23° C. of the gas barrier films which were obtained in Examples and Comparative Examples was determined by cutting out the gas barrier film into 5 cm squares, and measuring the maximum gap generated between the film and the surface plate by a thickness gauge when the films were mounted on the surface plate with the substrate layer-side down and all sides pressed. Examples with an amount of warpage of 5 mm or less are denoted by A and Examples with an amount of warpage of more than 5 mm are denoted by B.

(4) Appearance Evaluation of Gas Barrier Film

The appearance of the gas barrier film was visually evaluated according to the criteria below.

A: Coloring or particles on the surface are not observed
B: Coloring or particles on the surface are observed

TABLE 1

| | Molar number of —COO— groups included in polycarboxylic acid/molar number of amino groups included in polyamine compound/molar number of zinc oxide | Oxygen permeability [ml/$m^2$ · day · MPa] | | IR area ratio B/A [−] | IR area ratio C/A [−] | IR area ratio D/A [−] | Appearance | Warpage |
|---|---|---|---|---|---|---|---|---|
| | | 0.3 μm | 1 μm (Converted value) | | | | | |
| Example 1 | 100/29.5/10 | 6.1 | 1.8 | 0.430 | 0.215 | 0.355 | A | A |
| Example 2 | 100/42.5/10 | 3.6 | 1.1 | 0.423 | 0.148 | 0.426 | A | A |
| Example 3 | 100/42.5/10 | 2.6 | 0.8 | 0.383 | 0.084 | 0.533 | A | A |
| Example 4 | 100/42.5/15 | 0.6 | 0.2 | 0.409 | 0.075 | 0.516 | A | A |
| Example 5 | 100/65/10 | 5.2 | 1.6 | 0.436 | 0.017 | 0.547 | A | A |
| Comparative Example 1 | 100/29.5/0 | 12.6 | 3.8 | 0.462 | 0.407 | 0.131 | A | A |
| Comparative Example 2 | 100/65/0 | 11.5 | 3.5 | 0.471 | 0.047 | 0.481 | A | A |

<Evaluation Method>

(1) Oxygen Permeability [ml/($m^2$·day·MPa)]:

The gas barrier films which were obtained in Examples and Comparative Examples were measured under the conditions of a temperature of 20° C. and humidity of 90% RH on the basis of JIS K 7126 using OX-TRAN 2/21 produced by Mocon, Inc.

The gas barrier films which were obtained in Examples were excellent in gas barrier performance under high humidity and also excellent in the balance of appearance and dimensional stability.

The present application claims priority based on Japanese Patent Application No. 2014-156311 which was applied for on Jul. 31, 2014 and all the disclosure thereof is taken in here.

The invention claimed is:

1. A laminated body comprising:
a substrate layer; and
a gas barrier film layer provided on at least one surface of the substrate layer,
wherein the gas barrier film layer is formed of a gas barrier film,
wherein the gas barrier film is a cured product of a coating material for a gas barrier,
wherein the coating material for a gas barrier comprising a polycarboxylic acid, a polyamine compound, a polyvalent metal compound, and a base,
wherein (molar number of —COO— groups included in the polycarboxylic acid)/(molar number of amino groups included in the polyamine compound)=100/25 to 100/90 in the coating material for a gas barrier,
wherein the polyamine compound includes polyethylene imine, and
wherein (a chemical equivalent of —COO— groups included in the polycarboxylic acid)/(a chemical equivalent of polyvalent metal contained in the polyvalent metal compound)=100/0.1 to 100/80 in the coating material for a gas barrier,
wherein the substrate layer is selected from the group consisting of a paper and a plastic film that contains a thermoplastic resin,
wherein the thickness of the substrate layer is 1 to 1000 μm,
wherein the oxygen permeability at 20° C. and 90% RH at a thickness of 1 μm of the gas barrier film layer is 5 ml/m$^2$·day·MPa or less, and
wherein, in an infrared absorption spectrum of the gas barrier film layer, when a total peak area in a range of an absorption band of equal to or more than 1493 cm$^{-1}$ and equal to or less than 1780 cm$^{-1}$ is A and a total peak area in a range of an absorption band of equal to or more than 1598 cm$^{-1}$ and equal to or less than 1690 cm$^{-1}$ is B, an area ratio of an amide bond which is indicated by B/A is 0.370 or more.

2. The laminated body according to claim 1,
wherein an inorganic compound or an oxide of an inorganic compound is deposited on the surface of the substrate layer.

3. The laminated body according to claim 1,
wherein the polycarboxylic acid includes at least one selected from the group consisting of polyacrylic acid, polymethacrylic acid, and a copolymer of acrylic acid and methacrylic acid.

4. The laminated body according to claim 1,
wherein the polyvalent metal compound includes one or two or more of divalent or higher valency metal selected from the group consisting of Mg, Ca, Zn, Ba and Al.

5. The laminated body according to claim 1,
wherein the polyvalent metal compound includes one or two or more of divalent metal compound selected from the group consisting of magnesium oxide, calcium oxide, barium oxide, zinc oxide, magnesium hydroxide, calcium hydroxide, barium hydroxide, and zinc hydroxide.

6. The laminated body according to claim 1,
wherein the base includes ammonia.

* * * * *